US000001158H

United States Statutory Invention Registration [19]

[11] Reg. Number: H1158

Perkins et al.

[43] Published: Apr. 6, 1993

[54] METHOD AND APPARATUS FOR SUPPLYING FOAM TO TANKS

[76] Inventors: Thomas K. Perkins, 6816 Stichter, Dallas, Tex. 75230; Sophany Thach, 5335 Bent Tree Forest Dr., Dallas, Tex. 75248; Kenneth C. Miller, 2902 Tam O'Shanter La., Richardson, Tex. 75080

[21] Appl. No.: 807,486

[22] Filed: Dec. 16, 1991

[51] Int. Cl.[5] ..... B65B 1/04

[52] U.S. Cl. ..... 141/11; 141/1; 114/74 R

*Primary Examiner*—Bernarr E. Gregory

[57] ABSTRACT

A method for supplying foam to a tank, said method comprising positioning a foam generator in a housing positioned over a tank opening, installing a foam solution line to provide foam solution to said foam generator, and supplying foam to at least a portion of said tanks. The foam generator in a housing comprises (a) a generally cylindrical body adapted to sealingly engage the tank above an opening in the tank, (b) a plate positioned to sealingly engage a first end of the cylindrical body to form a zone enclosed within the cylindrical body above the opening in the tank, and (c) a foam generator positioned in the enclosed zone for supplying foam to the tank. The method is useful for loading tanker ships.

9 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

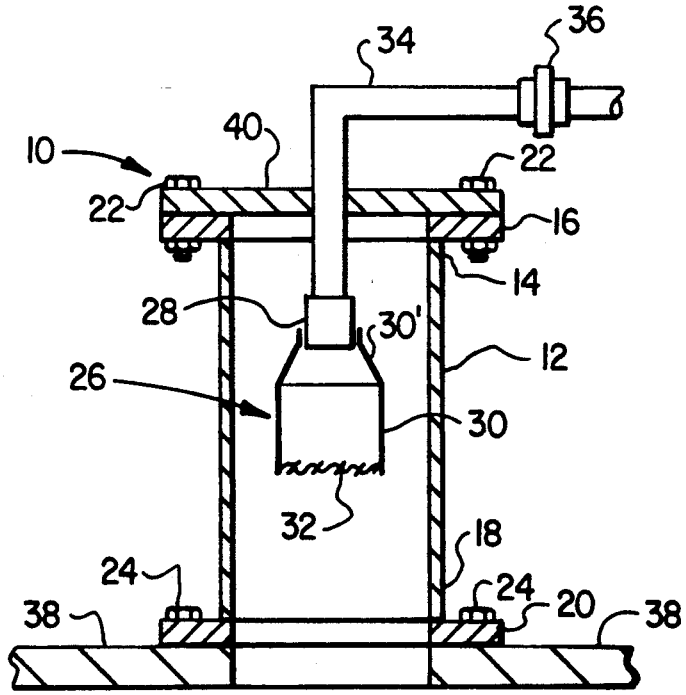

METHOD AND APPARATUS FOR SUPPLYING FOAM TO TANKS

BACKGROUND OF THE INVENTION

1. Field of the Invention

This invention relates to a method and apparatus for supplying foam to tanks using mounted foam generators and foam solution supply lines.

2. Background

When tanks are filled with crude oil or other chemicals which have a substantial vapor pressure, a continuing problem is the loss of light hydrocarbon or other vapors from the tank during filling. The vapors are lost primarily because the liquid filling the tank forces the vapors above the liquid from the tank, thereby forcing the vapors into the atmosphere. Inert gas has been used to prevent the formation of explosive mixtures in the tank by filling the tank with inert gas prior to filling the tank. The use of such inert gas does not prevent the loss of vapors of the liquid filling the tank from escaping into the atmosphere. If the liquid charged to the tank has a relatively high vapor pressure, then vapors from the liquid filling the tank will pass into the gas phase in the tank long before the tank is filled so that the gases emitted from the tank as the liquid level rises will contain substantial quantities of vapors resulting from the vaporization of the liquid filling the tank. It has been very difficult to find effective methods for preventing the discharge of this vapor from the tank. Various attempts have been made to pass the vapor to alternate tanking, recovery or treatment facilities and the like.

This problem is more acute when loading tankers with crude oil. The crude oil is frequently warmer than the ambient air when loaded into the tankers since crude oil is frequently transported at an elevated temperature. As well known to those skilled in the art, crude oil represents a large number of separate components, many of which are volatile at room temperature. These materials tend to vaporize from the crude oil, especially at elevated temperatures. Further, large volumes are loaded into and discharged from tankers during the transportation of crude oil. The vaporous materials lost during such loading are valuable hydrocarbon fuels that cannot be economically recovered for use as hydrocarbon fuels. Nevertheless, the control of this discharge is of great concern because of the undesirable discharge of benzene into the atmosphere. As a result, considerable effort has been directed to the development of improved methods for eliminating or controlling the discharge of vaporous hydrocarbons during the loading of crude oil tankers.

Previously, it has been proposed that the use of warm, inert gas will reduce the amount of hydrocarbon vapors lost during loading of tankers. Such an approach is shown in U.S. Pat. No. 5,054,526 entitled "Method and System for Reducing Hydrocarbon Vapor Emissions From Tankers", issued Oct. 8, 1991 to Thomas K. Perkins and assigned to Atlantic Richfield Company.

An earlier proposal shown in U.S. Pat. No. 3,850,206 entitled "Foamed Vapor Barrier", issued Nov. 26, 1974 to Garold P. Canevari and William M. Hooper, Jr. and assigned to Exxon Research and Engineering Company, uses a foamed barrier in the crude oil cargo area to control the release of vapors from the crude oil. It is proposed that the foam will ordinarily be supplied through existing openings in the deck which are frequently used for the cleaning apparatus.

U.S. patent application No. 07/653,398 entitled "Method for Controlling Vapor Emissions During Loading of Tankers", filed Feb. 11, 1991 by Thomas K. Perkins, now U.S. Pat. No. 5125439, discloses a process for supplying foam to tanks in a crude oil tanker prior to loading the crude oil by generating the foam at a central source and thereafter passing it through lines usually used for the loading of crude oil to produce a foam layer in the tanks in the tanker prior to loading the crude oil.

A variety of foams are known for controlling vapors from hazardous spills as shown in Report No. PB87-145660 "Handbook for Using Foams to Control Vapors from Hazardous Spills" Science Applications International Corporation, McLean, Virginia, prepared for the Environmental Protection Agency, Cincinatti, Ohio, July 1986 and in PB82-227117 "Evaluation of Foams for Mitigating Air Pollution from Hazardous Spills" MSA Research Corporation, Evans City, Pa., prepared for Municipal Environmental Research Lab, Cincinnati, Ohio, Feb. 1982.

U.S. Ser. No. 07/584,978 entitled "High Stability Foams for Long Term Suppression of Hydrocarbon Vapors", filed Sep. 19, 1990 by Kenneth Miller, Karen Schultz and Sophany Thach, and U.S. Ser. No. 07/908299 (a continuation of U.S. Ser. No. 07/584,978) entitled "High Stability Foams for Long Term Suppression of Hydrocarbon Vapors", filed Jul. 2, 1992 by Kenneth Miller, Karen Schultz and Sophany Thach (PCT/US 91/06795) disclose desirable foams for use in controlling the release of hydrocarbon vapors from crude oil.

In U.S. Ser. No. 07/653,398, it is disclosed that when foam is introduced into tanks on a tanker according to the existing commercial operation, the foam is dispensed through a foam generator which is mounted on a special Butterworth cover which closes a hatch at the top of the compartment. The generator is suspended into the compartment at the top and mixes a surfactant solution with the inert gas present in the compartment to form the foam. The foam exits the generator and falls into the bottom of the compartment to form a layer thereon before the crude oil is loaded through a loading manifold. The use of the in situ generator adds substantially to the capital cost of this system and its placement in the plurality of tanks is time-consuming and substantially increases the time for loading a tanker.

Accordingly, a continuing effort has been devoted to the development of methods for controlling and minimizing the release of hydrocarbon vapors from tanks during filling of the tank with liquids which release vapors.

SUMMARY OF THE INVENTION

According to the present invention, the release of vapors from a tank during the filling of the tank with a liquid is controlled by positioning a foam generator in a housing over an opening in the tank; installing a foam solution line to provide foam solution to the foam generator and supplying foam to the tank.

According to the present invention, the release of vapors from a plurality of tanks on a ship is controlled by positioning a foam generator in a housing over a tank opening on each of at least a portion of the plurality of tanks; installing a foam solution line to provide foam solution to the foam generators and supplying foam to at least a portion of the tanks.

The foam generator in a housing comprises (a) a generally cylindrical body adapted to sealingly engage a tank above an opening in the tank, (b) a plate positioned to sealingly engage a first end of the cylindrical body to form an enclosed zone within the cylindrical body and above the opening in the tank, and (c) a foam generator positioned in the enclosed zone for supplying foam to the tank.

DESCRIPTION OF PREFERRED EMBODIMENTS

In the discussion of the Figures, the same numbers will be used to refer to the same or similar components throughout. Further, pumps, valves and the like necessary to achieve the described flows have not been shown.

Figure 1:
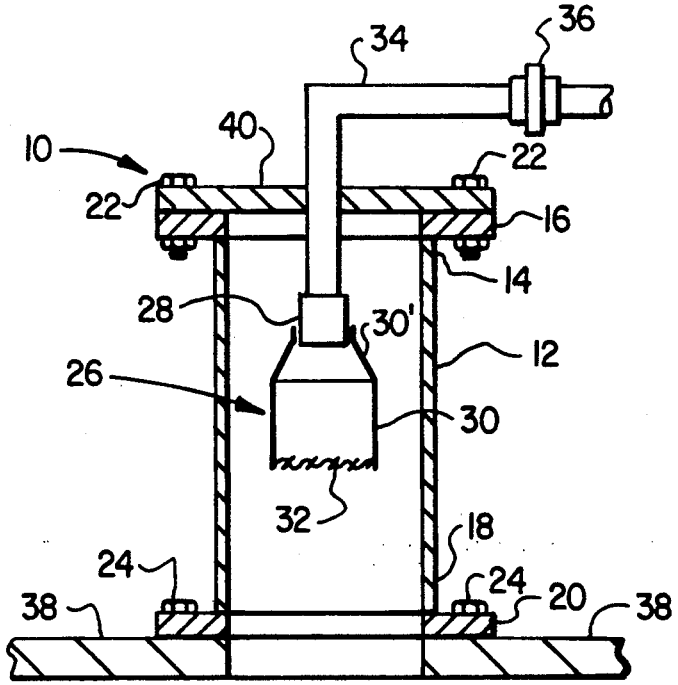
FIG. 1 is a schematic diagram of an embodiment of the present invention.

In FIG. 1, a sealed housing 10 containing a foam generator 26 is shown. Sealed housing 10 comprises a generally cylindrical spool 12 having a first flanged end 14 which includes a flange 16 and a second flanged end 18 which includes a flange 20. As shown, spool 12 is fastened to a deck or tank top 38 by bolts 24 which sealingly join flange 20 to deck 38 over an opening into a tank. A plate 40 is positioned in sealing engagement with flange 16 and retained in place by bolts 22. Spool 12 and plate 40 define an enclosed area above the opening into the tank. A foam generator 26 is positioned in the enclosed area and comprises a foam nozzle 28 positioned at a first end of a gas eductor 30 which includes near its other end a screen 32. A line 34 is positioned through plate 40 to supply foam solution to foam generator 26. Line 34 includes a coupling 36 for joining to other piping as required. Alternatively, welding, threaded fittings or other means known to those skilled in the art could be used to join spool 12 to deck 38 and plate 40 and to join spool 12 to a valve 42 (shown in FIG. 2) as discussed hereinafter.

In the operation of the embodiment shown in FIG. 1, foam is generated by passing foam solution through line 34 to nozzle 28 where a spray stream of foam solution is generated and directed generally axially through eductor 30 toward screen 32 where foam is generated by the impact of the stream of foam solution against screen 32. Gas required to form the foam is drawn into eductor 30 from the tank beneath deck 38 through openings (not shown) near the first end 30+ of eductor 30. Frequently, eductor 30 may simply comprise a cylindrical member. In other instances, it may be slightly conical at its first end but in any instance, considerable space will be provided around nozzle 28 for the flow of air or gas necessary to form the foam. It has been found that when relatively small eductors are used the foam generator can be placed at substantial distances above deck 38. When the eductor 30 is small relative to the spool 12, the flow of foam downwardly does not inhibit the flow of gas from the tank upwardly around the outside of eductor 30.

Figure 2:
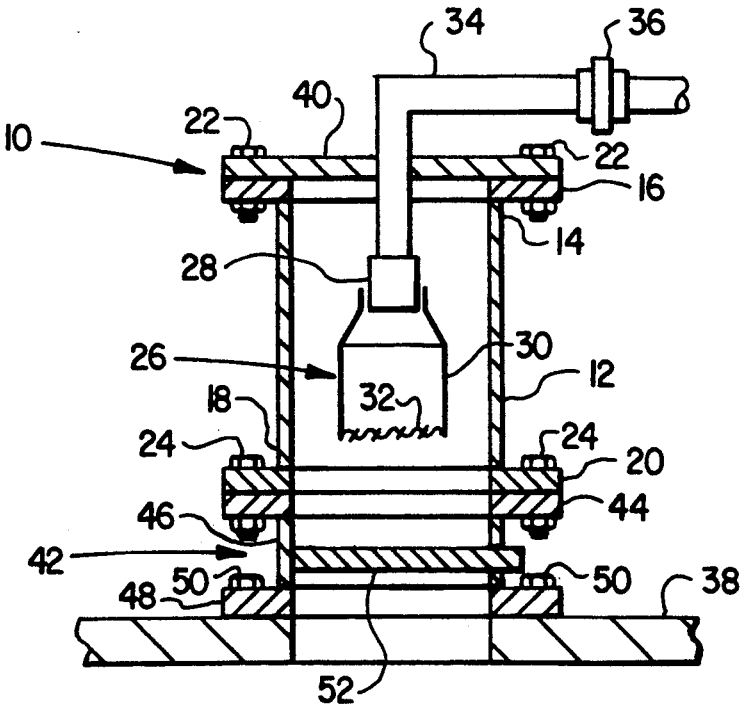
FIG. 2 is a schematic embodiment of a further embodiment of the present invention.

In FIG. 2, a further embodiment of the apparatus of FIG. 1 is shown. In FIG. 2, a valve 42 is positioned between flange 20 and deck 38. Valve 42 can be of any suitable type but is preferably a gate or slide valve so that a plate 52 is positioned across the entire inside diameter of spool 12 when valve 42 is closed. Valve 42 comprises a valve body 46 having the same or substantially the same interior diameter as spool 12, a flange 44 which is shown in sealing engagement with flange 20 and a second flange 48 which is shown in sealing engagement with deck 38. Flanges 20 and 44 are held in sealing engagement by bolts 24 and flange 48 is retained in sealing engagement with deck 38 by bolts 50. Suitable gaskets, sealants and the like may be used to facilitate sealing engagement of flange 16 and plate 40, flanges 20 and 44 and flange 48 and deck 38 as known to the art. It is desirable, when the foam generator is left in position in the housing formed by cylindrical spool 12 and plate 40 to be able to isolate foam generator 26 from the interior of the tank during transportation of crude oil, during cleaning of the tank, during repair of foam generator 26 and the like. Such is readily accomplished by closing valve 42 as shown in FIG. 2.

Figure 3:
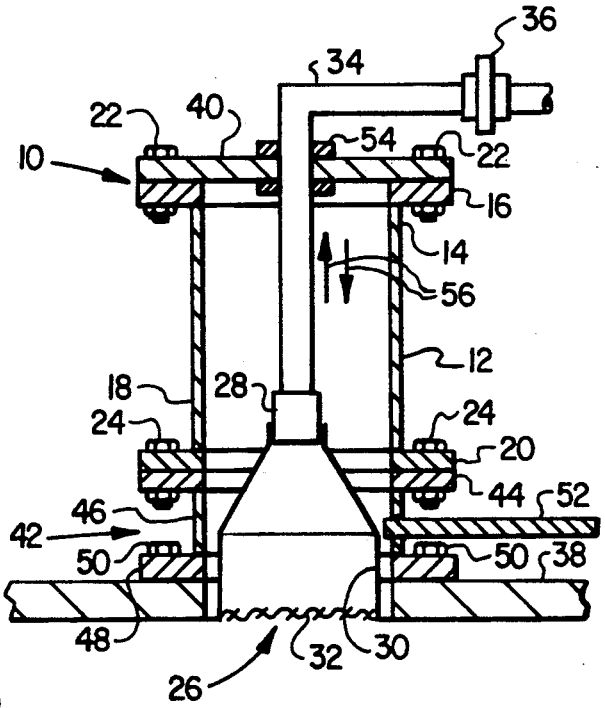
FIG. 3 is a schematic diagram of a further embodiment of the present invention.

In FIG. 3, a further embodiment of the present invention is shown. In FIG. 3, a larger diameter eductor is shown. Further, valve 42 is shown in an open position. When a larger eductor is used, as shown, it is desirable that foam generator 26 be placed nearer the bottom of the enclosed space. Desirably foam generator 26 does not extend beneath the bottom of the enclosed space. It has been found that with larger eductors it is desirable that foam generator 26 be placed nearer the bottom of the enclosed space so that suitable quantities of inert gas may be withdrawn from the tank for use in the production of the foam. When the outside diameter of the eductor is less than about seventy percent (70%) of the inside diameter of spool 12, foam generator 26 can be raised. In all instances it is desirable to vary the height of the foam generator within the enclosed space to optimize the production of foam or to produce foam of the desired expansion ratio (expansion ratio is equal to the volume of foams divided by the volume of the foam solution). Since foam can be produced at widely varying expansion ratios, the volume of foam produced may interfere to varying extents with the flow of gas upwardly around the stream of generated foam. In such instances, it is necessary to adjust the height of the foam generator in the enclosed space. Such a variation is shown in FIG. 3 wherein a seal 54 is shown in plate 40 for permitting slidable sealing engagement of line 34 by seal 54 to permit movement of foam generator 26 upwardly and downwardly within the enclosed space as shown by arrows 56. Further, it will be noted that in FIG. 3 the foam generator extends beneath the plate 52 of valve 42. In order to close valve 42 it is necessary that foam generator 26 be raised within the enclosed area.

Housing 10 used to enclose foam generator 26 is desirably installed permanently over each of the tanks to which it is desired to supply foam. The amount of foam which can be produced by foam generators is, of course, set for a particular generator by various parameters including the expansion ratio and the like and is well known to those skilled in the art. One or more foam generators may be positioned above openings into each tank to be filled. The foam generator housings, since they are to be permanent installations should be of a height compatible with tank operations. When used on tanker ships, it is desirable that housings 10 be no more than about 36 inches in height, although clearly, in instances where more space is available the housings could be taller. Similarly, spool 12 is frequently about 16 inches in diameter for tanker operations. Deck openings of about 15 ¾ inches are Commonly used for entry into tanks and spool 12 is desirably appropriately sized. It will be understood that any convenient size can be used for the diameter of the housing 10. When the housings 10 are permanently installed, then piping can be permanently installed to supply foam solution to foam generators 26. Since the volume of the foam solution is relatively small, it can be carried to all parts of a ship, tank farm or the like by relatively small flow lines. This is especially the case if the foam can be generated sequentially in a small number of the plurality of tanks at a given time. The piping to carry the foam solution can, of course, be sized to produce foam at the desired rate. Similarly, more than one housing and foam generator can be used for any given tank.

It should also be understood that in some instances, especially in tanker ship operations, it may be desirable to produce substantial quantities of foam in a particular tank for subsequent flow to other tanks. This may be the case even if foam generators exist on all of the tanks. As is well known to those skilled in the art, tanks in ships frequently contain flow passages therebetween and the like so that flow between tanks is readily achieved.

Clearly, foam generators 26 and housings 10 described above can be used in the normal commercial sequence of foam addition to tanks prior to adding crude oil to the tanks. The other aspects of the crude oil loading operation are substantially as practiced previously. In other words, the gases vented from the tank which are frequently inert gases produced by the combustion of hydrocarbon fuels or the like are vented to the atmosphere. The big difference is that the amount of hydrocarbon vapor in gases vented from tanks containing foam is greatly reduced.

Figure 4:
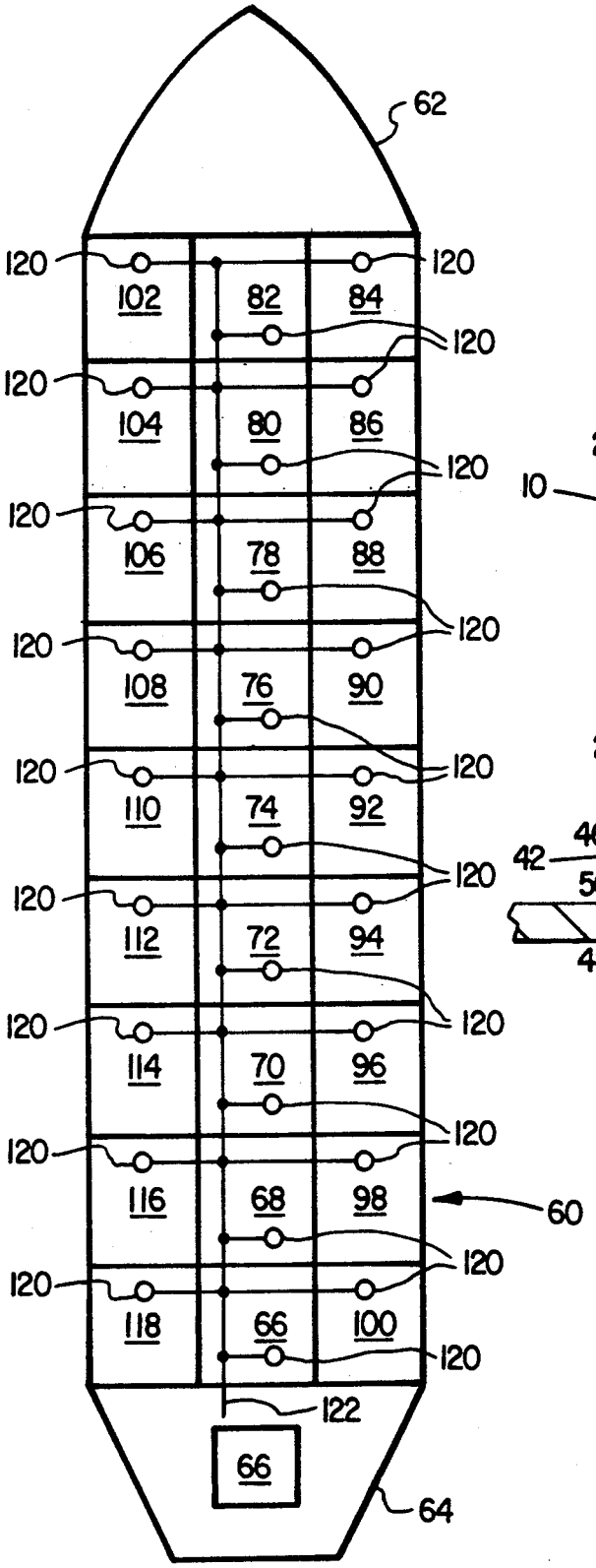
FIG. 4 is a schematic diagram of a tanker showing an embodiment of the present invention.

In FIG. 4 a tanker ship 60, having a plurality of compartments (66–118) is shown. Tanker 60, as shown, has a bow 62, a stern 64, a boiler 66 which is used to generate steam for a propulsion system (not shown) which includes a stream-driven turbine (not shown) which is mechanically or electrically linked to a propeller (not shown) to propel ship 60. Ship 60 includes a plurality of tanks shown as interior and exterior tanks. Interior tanks are shown by the numerals 66 through 82 with exterior tanks being shown by numerals 84 through 118. A plurality of ports 120 are shown entering each of the tanks. The ports are desirably utilized for the installation of sealed housings including foam generators 26 on all or a portion of the tanks. A line 122 is shown in fluid communication with each of fluid generators 26 positioned at openings 120. Line 122 includes suitable valving to permit the flow of foam solution to any or all of foam generators 26. Desirably, line 122 will be sized to provide foam solution in a quantity sufficient to supply the maximum number of foam generators 26 which will be used at any given time. Suitable valving (not shown) to accomplish the flow to the desired foam generators is included. Of course, additional openings may exist in the various tanks for cleaning, venting and the like and more than one foam generator 26 can be used in any or all of the tanks.

As indicated previously, a wide variety of foams are known for such applications. The foams are desirably materials which are stable in the presence of crude oil or the liquids to be contained in the tank in which the foam is used.

While the present invention has been discussed by reference to crude oil tankers, it will be understood that the apparatus discussed can be used in conjunction with a wide variety of tanks to position a foam generator to supply foam to the tanks.

Foam generators of the type discussed are considered to be well known to the art as shown in *Foam Systems and Components for Fire Protection, Spill Mitigation. Dust and Fume Control* published by MSA Research Corporation, Pittsburgh, Pa. Jan. 1990. In the operation of the foam generators, the foam generator size may vary widely. For instance, the use of small foam generators of approximately seven inches in diameter inside a spool 12 having a sixteen inch diameter has been found to be effective. The amount of foam generated using such generators in the enclosed space has produced an amount of foam substantially equivalent to the use of the foam generator outside the enclosed space. Alternatively, when larger diameter generators, such as eleven inch diameter generators are used, it has been found desirable in some instances to lower the foam generator to nearly the bottom of the enclosed space. The selection of a proper height for the foam generator in the enclosed space will vary widely depending upon the volume and expansion ratio of the foam generated and the like. Such variations are considered to be well known to those skilled in the art.

Having thus described the present invention by reference to certain of its preferred embodiments, it is respectfully pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

We claim:

1. An apparatus for supplying foam to a tank, said apparatus comprising:

(a) a cylindrical body positioned to sealingly engage said tank above an opening in the top of said tank;

(b) a plate positioned to sealingly engage a first end of said cylindrical body to form an enclosed zone within said cylindrical body and above said opening in said tank; and (c) a foam generator positioned in said enclosed zone for supplying foam to said tank.

2. The apparatus of claim 1 wherein said foam generator comprises an eductor having a screen positioned across a discharge end of said eductor and a nozzle for directing a stream of foam solution axially through said eductor toward said screen, said nozzle being positioned near an inlet end of said eductor.

3. The apparatus of claim 2 wherein a foam solution line is positioned through said plate and in fluid communication with said nozzle and a foam solution supply.

4. The apparatus of claim 3 wherein said foam solution line is slidably and sealingly positioned through said plate.

5. The apparatus of claim 3 wherein said eductor has an outer diameter less than 70 percent of the inside diameter of said cylindrical body.

6. The apparatus of claim 3 wherein said foam generator includes a fan to increase the air flow through said eductor.

7. A method for supplying foam to a plurality of tanks on a ship, said method comprising:

(a) positioning at least one foam generator in a housing positioned over a tank opening on each of at least a some of said plurality of tanks;

(b) installing a foam solution line to provide foam solution to said at least one foam generator; and (c) supplying foam to at least a portion of said tanks.

8. The method of claim 7 wherein at least one foam generator is positioned to supply foam to each tank.

9. The method of claim 8 wherein foam is sequentially supplied to at least a portion of said tanks.

* * * * *